May 29, 1945. W. C. CARD, JR 2,377,208
METHOD OF MAKING SHOES
Filed March 10, 1944 2 Sheets-Sheet 1
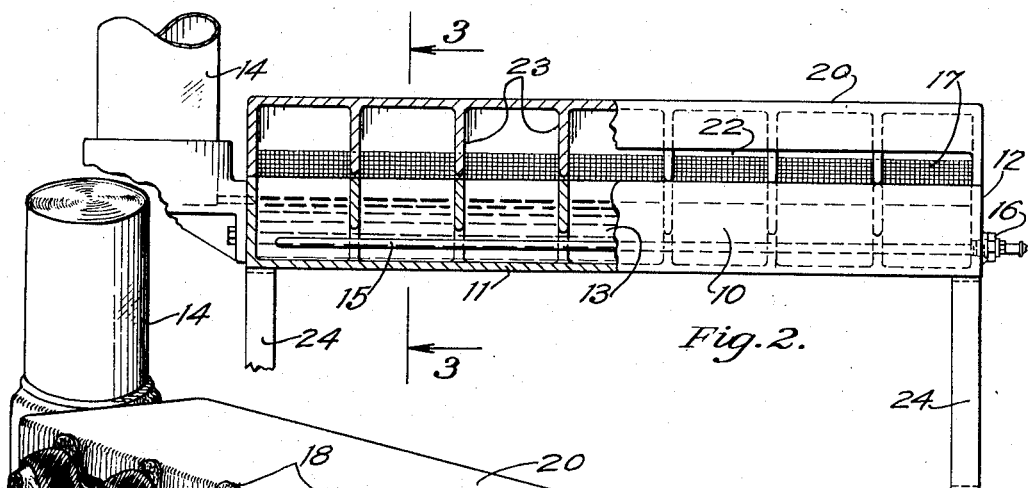
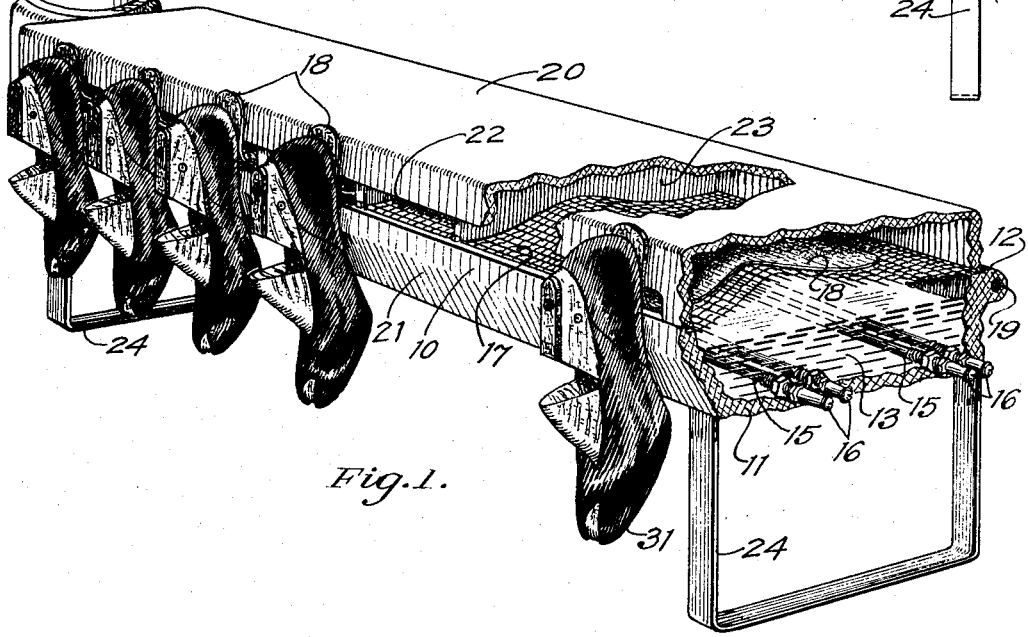
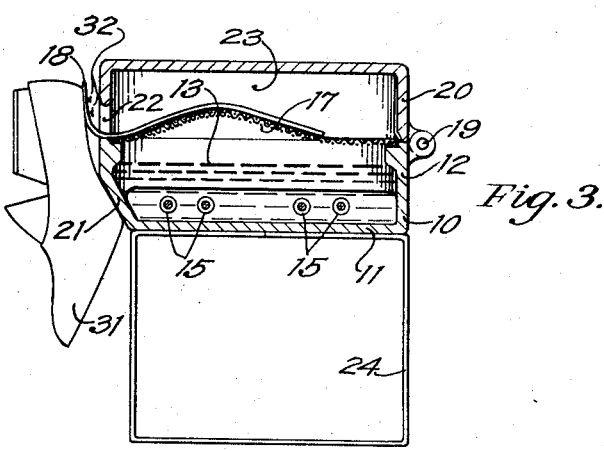
Inventor
Wm. C. Card Jr.
by Watson, Bristol, Johnson & Leavenworth
Attorneys May 29, 1945.  W. C. CARD, JR  2,377,208
METHOD OF MAKING SHOES
Filed March 10, 1944  2 Sheets-Sheet 2
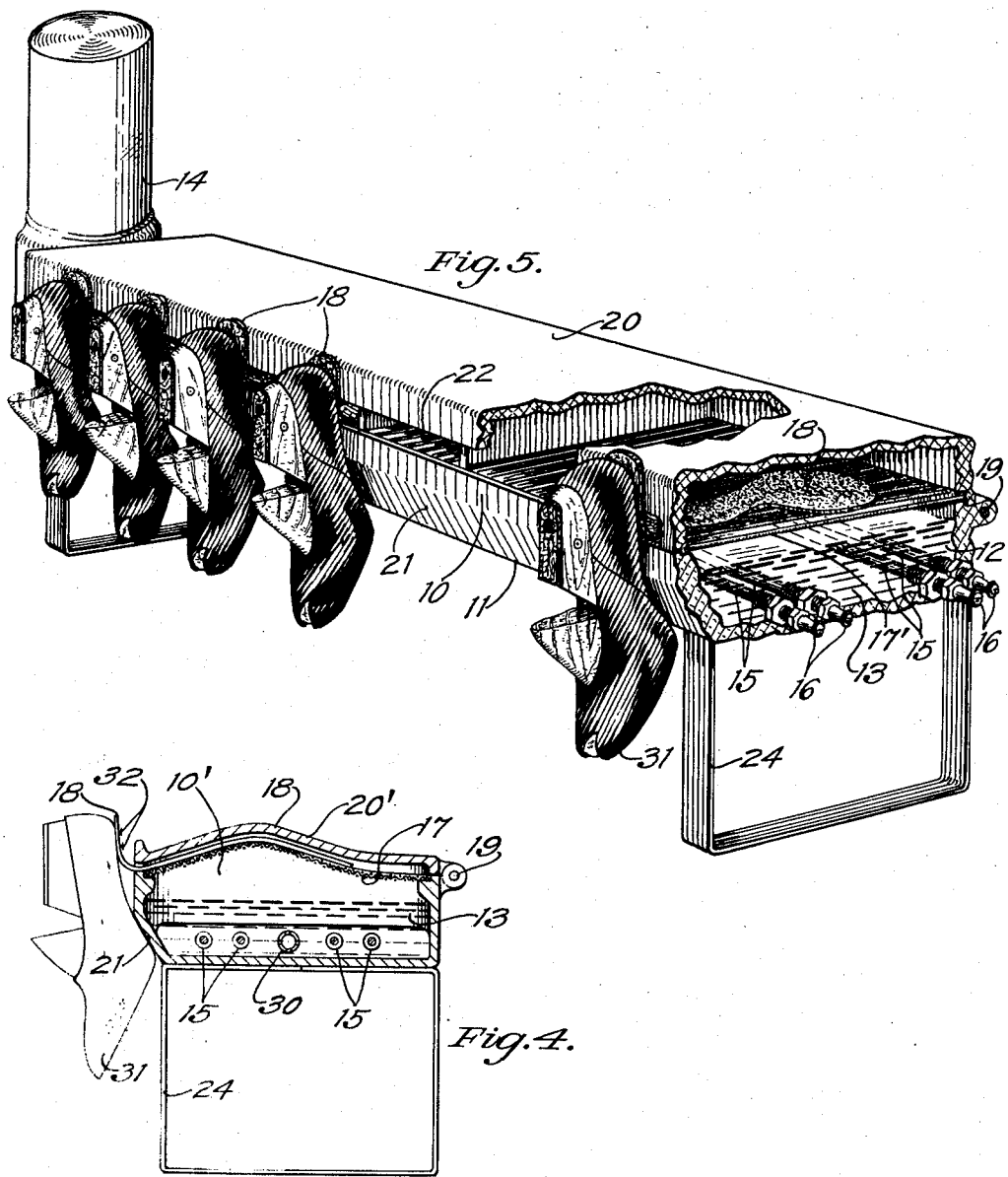
Inventor
Wm. C. Card Jr.
by Watson, Bristol, Johnson & Leavenworth
Attorneys Patented May 29, 1945

2,377,208

UNITED STATES PATENT OFFICE 2,377,208

METHOD OF MAKING SHOES

William Carpenter Card, Jr., Winthrop, Mass., assignor to Compo Shoe Machinery Corporation, Boston, Mass., a corporation of Delaware Application March 10, 1944, Serial No. 525,911

12 Claims. (Cl. 12—142)

This invention relates to methods of making cemented shoes and the treatment of outsoles therefor to facilitate the application of and the adhesive attachment of the outsoles to the shoe bottoms.

More particularly the invention relates to a method of treating outsoles and the making of shoes therewith, said outsoles having the marginal edges of their attaching faces coated with a waterproof, thermoplastic cement (i. e., one which does not become sticky or tacky when exposed to water at room temperature), by means of which the outsoles may be simultaneously mulled or tempered and the cement thereon softened or "activated" for application and attachment to the shoe bottom, preferably while simultaneously molding, or maintaining a previously formed mold in the outsole.

A principal object of the invention is to provide a method for so treating and forming such outsoles whereby reduced operating costs and improved shoe quality are attained.

Other objects of the invention will in part be obvious and will in part appear hereinafter.

In the manufacture of cemented shoes it has already been suggested to use thermoplastic, i. e., heat-activatable, cement for permanently attaching the outsole to the shoe bottom and activating such cement in various ways, e. g., by subjecting it to the influence of an electrostatic or electromagnetic field, by infra-red rays or directly with radiant heat or a steam jet. It has been likewise proposed to heat-activate the cement while protecting the uncoated portions of the leather sole from drying out. It has also been suggested to condition outsoles by mulling or tempering them in an atmosphere of steam or water vapor. It has been further suggested simultaneously to activate the cement on and to temper such miscellaneous portions of shoes, such as box toes, heel breast flaps and McKay channel flaps, by means of steam or vapor, and heat.

Heretofore, however, it has not to my knowledge been proposed simultaneously to mull or temper the outsole and to activate a waterproof, thermoplastic cement on prepared and unattached outsoles; or simultaneously so to treat such outsoles while molding them or while maintaining the mold previously formed in the outsoles. By the present invention I have provided a method by means of which these last mentioned operations can efficiently and economically be accomplished.

For a fuller understanding of the nature and objects of the invention reference should be had to the following detailed description taken in connection with the accompanying drawings, in which:

Fig. 1 is a perspective view, partly in section, showing one form of apparatus comprising my invention and showing a plurality of outsoles in the process of treatment;

Fig. 2 is a front elevation, partly in section, of the apparatus shown in Fig. 1;

Fig. 3 is a sectional view taken substantially along lines 3—3 of Fig. 2;

Fig. 4 is a sectional view, similar to Fig. 3, but showing another form of apparatus which may be used to carry out my method; and Fig. 5 is a perspective view, partly in section, showing a modified form of apparatus.

Referring more particularly to Figs. 1 to 3, it will be seen that a suitable and preferred form of apparatus comprises a sole tempering and cement activating chamber generally designated as 10, comprising a lower portion or base 11 forming a receptacle 12 adapted to hold a body of water 13 which may be supplied from a tank 14. Preferably, the water in the receptacle is heated by means of electrical resistance heaters 15 which may be of a known direct immersion type terminating in the form of the screw plugs 16, which are threaded into the end walls of the base 11. Of course other suitable heating means, supplying sufficient heat to bring the water to the temperature required to supply the heat and vapor necessary to mull or temper the soles and to activate the cement thereon, may be employed.

Disposed above the water 13 at a sufficient height to prevent splattering is situated a screen 17 that is located transversely of the receptacle 12 and extends longitudinally of the chamber 10; and, in the preferred form of apparatus this screen is curved to conform to the average curvature of molded outsoles so as to retain the mold in a premolded sole 18 or tend to mold a non-premolded sole during the tempering operation to facilitate the application and levelling thereof on the shoe bottom as the sole is cement attached thereto.

Hinged to the base portion 11 at 19 is a cover member 20 which extends over the receptacle 12 and downwardly towards the angled wall 21, which serves as a shoe rest, to provide a longitudinally extending horizontal slot 22 in the front face of the tempering and activating chamber 10 and the cover is provided with a plurality of dividing walls 23 which have their lower edges curved to match the screen 17, thus forming separate compartments into which the outsoles to be treated may be inserted without interference with each other. The cover 20 also acts to retain the vapor around the outsoles during the tempering and activating operation.

In using the apparatus, the temperature of the water 13 in the receptacle 12 is preferably maintained at from 90°–95° C. by means of a suitable thermostatic control (not shown), and the outsoles are treated for a period of up to two minutes, as within this range it has been found that it gives a sufficient amount of heat and water vapor to temper the sole and to activate various types of waterproof thermoplastic cements with which the outsoles may be coated and hereinafter referred to. As will be readily understood by one skilled in the art, the temperature and the time of treatment may be readily correlated to accomplish the desired results depending on the particular condition of the sole and the nature of the cement used.

The complete apparatus may be attached by the brackets 24 to or near a shoe pressing machine, e. g., that shown in the patent to Weiss No. 1,945,762.

In the modified form of apparatus shown in Fig. 4 the cover member 20' lies adjacent and has its lower face substantially conformed to the curvature of the screen 17 so as to act positively to retain the mold in premolded outsoles or, in case non-premolded soles are used, acts to mold them during the tempering and activating operation.

In this modification also there is provided a perforated pipe 30 immersed in the water 13 through which air may be blown to agitate the liquid and to facilitate the circulation of vapor within the chamber 10'. This latter may also be used, if desired, in the forms of apparatus shown in Figs. 1 and 5. By this means a lower temperature can be used in some cases when water is utilized as the activating and tempering liquid; or if one desires merely to activate the cement, a suitable solvent can be used in place of the water with a corresponding reduction in the temperature used, as will be well understood by one skilled in the art.

In Fig. 5 another form of apparatus, in which certain steps of my novel method may be carried out, is shown, in which the sole supporting member corresponding to the screen 17 in Fig. 1 is composed of spaced bars 17', which are located so as to present a flat surface to the sole. One skilled in the art will readily understand that with this form of apparatus the tempering and activating operations can also be carried out, and the molding and levelling of the outsole can in certain cases be subsequently accomplished on the shoe press in which the cemented sole is attached in the usual manner to the shoe bottom. It will also be understood that such bars 17' may be curved and used in place of the screen 17 in the apparatus shown in Figs. 1 and 4, and that a flat screen may be used in place of the bars in Fig. 5. The two will hereinafter be referred to as a foraminous support. In each form of apparatus shown, it will be seen that when treating a sole which has previously been secured to the heel portion of the shoe bottom the front face 21 of the chamber 10 acts as a support for the shoe.

In its preferred form my method comprises preparing a lasted, trimmed and roughed upper 31, preparing a rounded and roughed outsole, 18, applying to the roughened and thus prepared shoe bottom and the roughened attaching face of the outsole a waterproof cement such as a solution of a butadiene polymer or of polymerized chloroprene or of polyvinyl acetate or polyvinyl butyral and allowing the same to dry, then molding the outsole, locating it by means of tacks 32 or other fasteners, for example, at the heel seat of the shoe 31, inserting the outsole 18 into the chamber 10 above the foraminous support 17 with the shoe and its last hanging downwardly from the slot 22, and supported by the wall 21, allowing the outsole to remain in the treating chamber until the cement has been activated and the sole sufficiently tempered to permit proper levelling when attaching same to the shoe bottom, and then removing the outsole from the treating chamber and quickly placing it and the shoe upper in a suitable shoe press where it is allowed to remain until the cement has cooled sufficiently to permit removal of the shoe from the press.

A preferred type of shoe press is one in which the pressure is provided by means of an inflatable pad on which the outsole rests and against which the shoe is clamped such as, for example, a press of the type shown in the previously mentioned Weiss patent. Such presses employing pneumatic or resilient sole pressing pads will hereinafter be referred to as pneumatic shoe presses.

If desired, one can carry out the process without either premolding or locating the outsole on the heel seat of the shoe prior to the tempering and activating treatment. In this case, when using an apparatus as shown in Fig. 1 the outsole as it becomes tempered, tends naturally to follow the shape of the supporting screen 17 and, particularly in the form of apparatus shown in Fig. 4, the outsole is forced to partake of the supporting screen shape by the cover 20'; but, in any event, whether the apparatus of Figs. 1, 4 or 5 is used, the sole may be sufficiently tempered so that after the cement is activated and the sole is located on the shoe bottom and the two members are placed in the shoe press, the sole can be molded in and properly levelled.

Furthermore it will readily be seen that when a premolded sole is used which has been sufficiently tempered, the apparatus shown in Figs. 1 and 4 can be used with benefit, merely for the purpose of activating the cement while preventing or tending to prevent loss of the mold shape in the outsole. In this case the vapor of a solvent for the cement may be used instead of water vapor for the activation of the cement.

Since certain changes in carrying out the above process and in the constructions set forth, which embody the invention, may be made without departing from its scope, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In a method of making cemented shoes, the steps comprising providing a lasted upper and a molded outsole having their corresponding attaching faces coated with waterproof cement, activating the cement on the outsole while holding the outsole to maintain the molded form thereof, and thereafter permanently affixing the outsole to and leveling it on the lasted upper.

2. In a method of making cemented shoes, the steps comprising providing a lasted upper and a molded outsole having their corresponding attaching faces coated with waterproof thermoplastic cement, simultaneously mulling the outsole and activating the cement on the outsole by means of heated water vapor while holding the outsole in its molded form, and thereafter permanently affixing the outsole to and leveling it on the lasted upper.

3. In a method of making cemented shoes, the steps comprising providing a lasted upper and an outsole having their corresponding attaching faces coated with waterproof thermoplastic cement, treating the cemented outsole with heated water vapor simultaneously to activate the cement and to mull the outsole while supporting the outsole on a curved foraminous surface substantially corresponding to the outsole's ultimate shape on the shoe, and thereafter permanently affixing the outsole to the lasted upper in a pneumatic shoe press.

4. In a method of making cemented shoes, the steps comprising providing a lasted upper and a molded outsole having their corresponding attaching faces coated with waterproof thermoplastic cement, treating the cemented outsole with heated water vapor simultaneously to activate the cement and to mull the outsole while supporting the outsole on a curved foraminous surface substantially corresponding to the mold of the outsole, and thereafter permanently affixing the outsole to the lasted upper in a pneumatic shoe press.

5. In a method of making cemented shoes, the steps comprising providing a lasted upper and an outsole having their corresponding margins coated with thermoplastic waterproof cement, treating the cemented outsole with heated water vapor simultaneously to activate the cement and to mull the outsole while supporting the outsole on and forcing it against a curved foraminous surface substantially corresponding to the outsole's ultimate shape on the shoe, and thereafter permanently affixing the outsole to and leveling it on the lasted upper.

6. In a method of making cemented shoes, the steps comprising providing a lasted upper and an outsole having their corresponding attaching faces coated with waterproof thermoplastic cement, aligning said outsole with respect to said upper and securing its heel end to the heel seat of the upper to maintain said alignment, placing said aligned outsole in a chamber containing heated water vapor to activate the cement thereon, and thereafter pressing said aligned parts together to permanently attach said outsole to said lasted upper.

7. In a method of making cemented shoes, the steps comprising providing a lasted upper and an outsole having their corresponding attaching faces coated with waterproof thermoplastic cement, aligning said outsole with respect to said upper and securing its heel end to the heel seat of the upper to maintain said alignment, subjecting said aligned outsole to the action of heated water vapor simultaneously to activate the cement thereon and to mull the outsole material, and thereafter pressing said aligned parts together to permanently attach said outsole to said lasted upper.

8. In a method of making cemented shoes, the steps comprising providing a lasted upper and an outsole having their corresponding attaching faces coated with vapor and heat-activatable waterproof cement, aligning said outsole with respect to said upper and securing its heel end to the heel seat of the upper to maintain said alignment, subjecting said aligned outsole to the action of a heated vapor to activate the cement thereon, and thereafter pressing said aligned parts together to permanently attach said outsole to said lasted upper.

9. In a method of making cemented shoes, the steps comprising providing a lasted upper and an outsole having their corresponding attaching faces coated with vapor and heat-activatable waterproof cement, aligning said outsole with respect to said upper and securing its heel end to the heel seat of the upper to maintain said alignment, subjecting said aligned outsole to the action of heated vapor to activate the cement thereon, and thereafter pressing said aligned parts together to permanently attach said outsole to said lasted upper.

10. In a method of making cemented shoes, the steps comprising providing a lasted upper and an outsole having their corresponding attaching faces coated with waterproof thermoplastic cement, aligning said outsole with respect to said upper and securing its heel end to the heel seat of the upper to maintain said alignment, subjecting said aligned outsole to the action of heated water vapor to activate the cement thereon while maintaining said lasted upper substantially at room temperature, and thereafter pressing said aligned parts together to permanently attach said outsole to said lasted upper.

11. In a method of making cemented shoes, the steps comprising providing a lasted upper and an outsole having their corresponding attaching faces coated with vapor and heat-activatable waterproof cement, aligning said outsole with respect to said upper and securing its heel end to the heel seat of the upper to maintain said alignment, activating the cement on one of said parts by placing its cemented side on a foraminous support having heated vapor passing therethrough, and thereafter pressing said aligned parts together to permanently attach said outsole to said lasted upper.

12. In a method of making cemented shoes, the steps comprising providing a lasted upper and an outsole having their corresponding attaching faces coated with vapor and heat-activatable waterproof cement, aligning said outsole with respect to said upper and securing its heel end to the heel seat of the upper to maintain said alignment, subjecting one of said coated parts to the action of heated vapor to activate the cement thereon while maintaining the other of said coated parts substantially at room temperature, and thereafter pressing said aligned parts together to permanently attach said outsole to said lasted upper.

WILLIAM CARPENTER CARD, Jr.